June 3, 1941. R. E. H. POMEROY 2,244,372
WIND BOX FOR SINTERING MACHINE
Filed Aug. 15, 1939
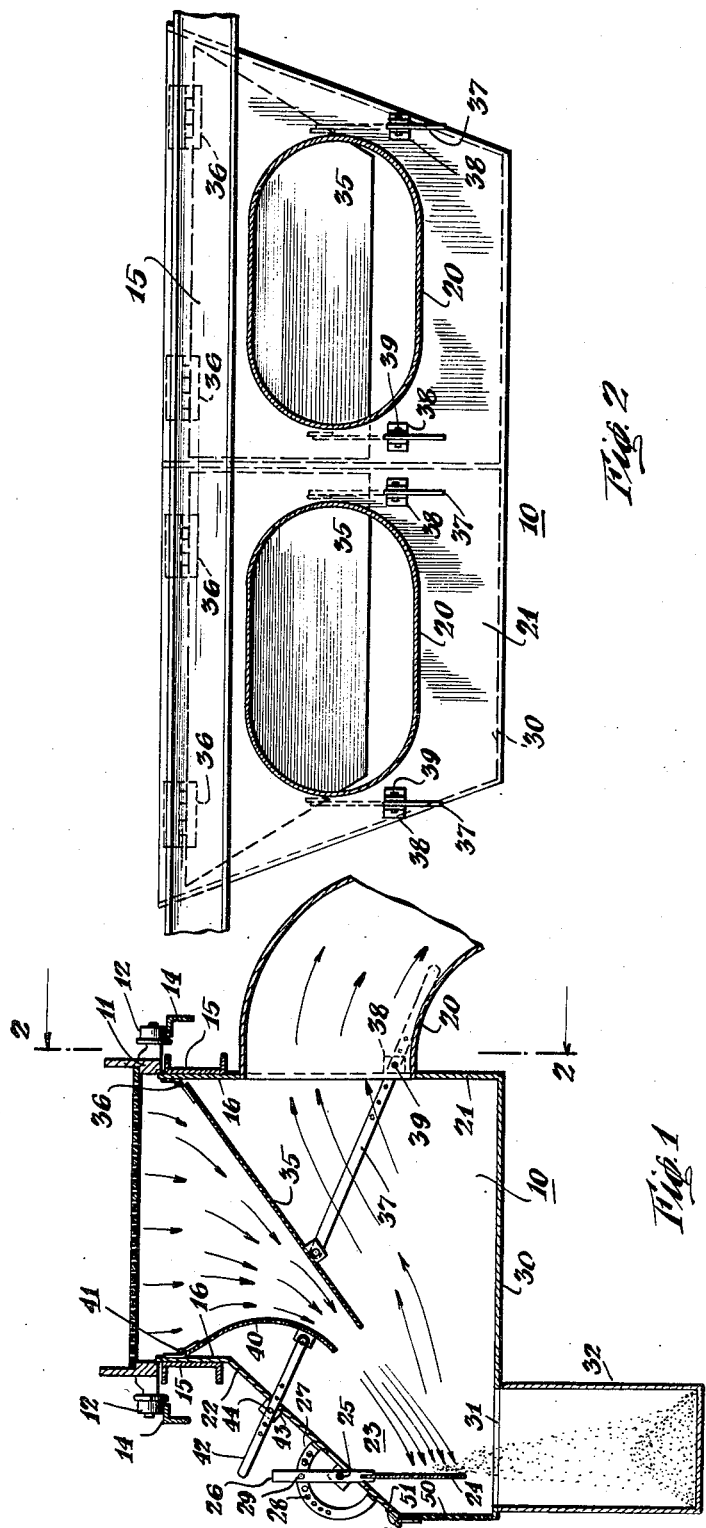
INVENTOR
R.E.H. Pomeroy
BY
James K. Kent
ATTORNEY Patented June 3, 1941

2,244,372

UNITED STATES PATENT OFFICE 2,244,372

WIND BOX FOR SINTERING MACHINE

Ralph E. H. Pomeroy, Rosita, Mexico, assignor to American Smelting and Refining Company, New York, N. Y., a corporation of New Jersey Application August 15, 1939, Serial No. 290,278

9 Claims. (Cl. 183—105)

This invention relates generally to wind boxes for sintering machines and more particularly to a wind box having a dust trap or dust removal apparatus incorporated therein for removing the dust or other solid particles from the exhaust gases prior to the passage thereof through the exhaust flue leading to the suction fan.

An object of the invention is to provide means for removing such dust particles immediately after the gases are drawn into the wind box so that the particles are prevented from contacting and abrading the subsequent apparatus through which the gases pass.

Another object is to provide a dust trap of the above type of such construction that it may be incorporated in the wind box of a standard sintering machine with a minimum amount of alteration.

Another object is to provide a combined wind box and dust trap which occupies substantially the same amount of space as the usual wind box of a sintering machine.

Another object is to provide an apparatus of the above type which is substantially self-cleaning, whereby the necessity for shutting down the apparatus for cleaning or the removal of dust is substantially avoided.

Another object is to provide a simple, efficient and dependable apparatus of the type above indicated.

Various other objects and advantages will be apparent as the nature of the invention is more fully disclosed.

Although the novel features which are believed to be characteristic of this invention will be more particularly pointed out in the claims appended hereto, the invention itself may be better understood by referring to the following description, taken in connection with the accompanying drawing, in which a specific embodiment thereof has been set forth for purposes of illustration.

In the drawing:

Fig. 1 is a transverse section through the wind box of a sintering machine embodying the present invention; and Fig. 2 is a section taken on the line 2—2 of Fig. 1.

Referring to the drawing more in detail, the invention is shown as applied to the wind box 10 of a standard straight-line sintering machine having pallets 11 carrying the charge to be sintered and provided with wheels 12 which travel on rails 14. The wind box is supported by brackets 15 and is provided with flanges 16 which register with the under-side of the pallets 11 so as to form an air seal therefor.

It is to be understood that the sintering machine and associated elements are of generally standard construction and, for that reason, only so much thereof has been shown herein as is essential to an understanding of the present invention. It is also to be understood that the sintering machine may be provided with a plurality of wind boxes which are adapted to successively register with the pallets as they pass through the machine. Two such wind boxes have been shown in Fig. 2 for purposes of illustration.

Each of the wind boxes 10 is provided with an exhaust flue 20 communicating with a side wall 21 of the wind box. Each flue 20 is shown as elongated in the direction of travel of the pallet and communicating with the wind box throughout substantially the entire length thereof so as to effect a substantially uniform distribution of the gases therein and also to provide a substantial area so that the velocity of the gases passing therethrough is greatly reduced, as will be hereinafter described.

The opposite side wall 22 of the wind box is shown as inclined outwardly to form a dust removal chamber 23. An impact plate 24 is pivotally mounted on the inclined wall 22 as by a pin 25 and is provided with an adjusting handle 26 by means of which the angular position thereof may be adjusted. Suitable securing means, such as a bracket 27 having a plurality of holes 28 adapted to receive a pin 29 carried by the handle 26, may be provided for securing the impact plate 24 in any angular position of adjustment. The wind box 10 is provided with a bottom 30 having an aperture 31 below the impact plate 24 in a position such that the dust particles which are removed by said impact plate pass downwardly through said aperture into a collecting receptacle 32.

The wind box is provided with an adjustable throat for directing the gases against the impact plate 24. In the embodiment shown, this throat comprises a deflector plate 35 which is secured by a hinge 36 to the flange 16 above the exhaust flue 20 and is provided with adjusting links 37 which extend to the outside of the wind box. Brackets 38 receive pins 39 by which the links may be secured in any selected position. An adjustable curved throat plate 40 is hinged to the opposite flange 16 by a hinge 41 and is adjustably held by links 42 which extend outwardly through the inclined wall 22 of the wind box and are adjustably secured in brackets 43 by pins 44. The wind box is also provided with a clean-out door 50 hinged at 51 to the wall 22.

In the operation of the above described device, the deflector plate 35 and the adjustable throat plate 40 are so positioned as to provide the desired direction and velocity of gas flow through the throat formed therebetween. The gas, which is laden with dust picked up in its passage through the charge on the pallets, is thus caused to impinge against the impact plate 24. Thereafter, the gas makes an abrupt change in direction and passes outwardly below the deflector plate 35 to the exhaust flue 20 leading to the suction fan, not shown. The dust and solid particles are thrown out at the impact plate 24 both by the change in direction of the gases and by the decreasing velocity of the gases as they pass through the portion of the wind box below the deflector plate 35 to the exhaust flue. The impact plate 24 is readily adjustable to any angle that yields the most effective dust separation.

Under usual conditions of operation in a sintering machine, the rate of flow of air through the various pallets and the flow of exhaust gases varies in accordance with the nature of the charge on the pallets and may vary throughout the length of the machine, being different, for example, in the different wind boxes or even in the different parts of the same wind box. The present invention makes it possible to adjust independently the positions of the various baffles and the throat openings in the different wind boxes so as to adjust each of the wind boxes to the efficient removal of dust particles under the particular conditions of operation which are present therein. The deflector plate 35 may be readily cleaned by dropping the same to vertical position and thereby allowing any deposits thereon to fall off. The wind box itself may be cleaned when necessary through the clean-out door 50. In normal operation, however, the dust is removed and falls directly through the opening 31 into the receptacle 32 from which it may be periodically removed. The machine is accordingly adapted to continuous operation without requiring frequent shut-downs for dust removal.

The removal of the dust immediately after the exhaust gases are received from the charge increases the life of the remainder of the apparatus by reducing the abrasive effect of the dust particles thereon. The exhaust flue preferably extends substantially the entire length of the impact plates 24 so that the gas flow and dust removal is uniform throughout the length of the wind box. It is to be understood that the wind boxes or baffles may be divided longitudinally of the machine, if necessary, to provide individual adjustment according to the varying conditions of operation. The particular construction shown provides for high velocity impingement of the gases against the impact plate with rapid reduction in gas velocity at the point of impact and a complete reversal of direction of gas flow. Furthermore, the gases leaving the impact plate are separated by the deflector plate 35 from the incoming gases and are thereby prevented from picking up further quantities of dust.

It will be noted that the construction is such that the wind box and dust separator may be used with standard installations without requiring material change in the machines or in the space allotted thereto.

Although a specific embodiment of the invention has been shown for purposes of illustration, it will be understood that various changes and modifications may be made by those skilled in the art within the scope of the invention as defined by the appended claims.

Certain specific terms have been used for convenience in referring to various details of the invention. These terms, however, are to be given as broad an interpretation as the state of the art will permit. The invention is only to be limited in accordance with the following claims.

What is claimed is:

1. A wind box for a sintering machine, said wind box having a top opening to receive exhaust gases from said machine, an impact plate mounted at one side of said wind box, means to direct gases from said top opening at high velocity onto said impact plate, and an exhaust flue communicating with the other side of said wind box whereby the gases are caused to make a substantially complete reversal in direction at said impact plate before passage to said exhaust flue.

2. A wind box for a sintering machine, said wind box having a top opening to receive exhaust gases from said machine, an impact plate mounted at one side of said wind box, a pair of baffle plates forming a throat therebetween adapted to direct gases from said top opening onto said impact plate at high velocity, and an exhaust flue communicating with the other side of said wind box to receive said exhaust gases after a substantially complete reversal in direction thereof at said impact plate.

3. A wind box for a sintering machine, said wind box having a top opening to receive exhaust gases from said machine, an impact plate mounted at one side of said wind box, a pair of baffle plates forming a throat therebetween adapted to direct gases from said top opening onto said impact plate at high velocity, and an exhaust flue communicating with the other side of said wind box to receive said exhaust gases after a substantially complete reversal in direction thereof at said impact plate, said baffle plates being mounted on opposite sides of said top opening and being adjustable for controlling the gas flow therebetween.

4. A wind box for a sintering machine, said wind box having a top opening to receive exhaust gases from said machine, an impact plate mounted at one side of said wind box, a pair of baffle plates forming a throat therebetween adapted to direct gases from said top opening onto said impact plate at high velocity, an exhaust flue communicating with the other side of said wind box to receive said exhaust gases after a substantially complete reversal in direction thereof at said impact plate, said baffle plates being hingedly mounted on opposite sides of said top opening, and means adjusting the angular positions thereof for controlling the gas flow.

5. A wind box for a sintering machine, said wind box having a top opening to receive exhaust gases from said machine, an impact plate mounted at one side of said wind box, an exhaust flue communicating with the other side of said wind box to receive said exhaust gases after a substantially complete reversal in direction thereof at said impact plate, and a pair of baffle plates mounted on opposite sides of said top opening and forming a throat positioned to direct gases passing therethrough onto said impact plate, and being arranged to provide a chamber of increasing area therebelow through which the gases pass to said exhaust flue and to separate the cleaned gases from the dust laden gases.

6. A wind box for a sintering machine, said wind box having a top opening to receive exhaust gases from said machine, an impact plate mounted at one side of said wind box, an exhaust flue communicating with the other side of said wind box to receive said exhaust gases after a substantially complete reversal in direction thereof at said impact plate, and a pair of baffle plates, said baffle plates being mounted on opposite sides of said top opening, one of said baffle plates being inclined to direct the gases onto said impact plate, the other of said baffle plates being curved to form with said first baffle plate a throat for increasing the gas velocity and directing the gases onto said impact plate.

7. A wind box for a sintering machine, said wind box having a top opening to receive exhaust gases from said machine, an impact plate mounted at one side of said wind box, a pair of baffle plates forming a throat therebetween adapted to direct gases from said top opening onto said impact plate at high velocity, and an exhaust flue communicating with the other side of said wind box to receive said exhaust gases after a substantially complete reversal in direction thereof at said impact plate, said impact plate and said exhaust flue extending substantially the entire length of said wind box for maintaining substantially uniform conditions of gas flow therein.

8. A wind box for a sintering machine, said wind box having a top opening to receive exhaust gases from said machine, an impact plate mounted at one side of said wind box, a pair of baffle plates forming a throat therebetween adapted to direct gases from said top opening onto said impact plate at high velocity, and an exhaust flue communicating with the other side of said wind box to receive said exhaust gases after a substantially complete reversal in direction thereof at said impact plate, said wind box having an increasing effective area from said impact plate to said exhaust flue whereby the gas velocity is decreased after contact with said impact plate.

9. A wind box for a sintering machine having a top opening to receive exhaust gases from said machine and a side inclined downwardly and outwardly with a dust removal chamber therebelow, an adjustably-mounted impact plate within said wind box positioned above said dust removal chamber, means to direct gases from said top opening at high velocity against said impact plate, and an exhaust flue communicating with said wind box through the opposite side thereof whereby the gases are caused to make a substantially complete reversal in direction at said impact plate before passing into said exhaust flue.

R. E. H. POMEROY.